(12) United States Patent
Houdyshell (10) Patent No.: US 7,334,905 B2
(45) Date of Patent: Feb. 26, 2008

(54) REARVIEW MIRROR FOR SKID STEER LOADER

(76) Inventor: Michael Houdyshell, 9891-63rd Ave. North, Maple Grove, MN (US) 55369

( * ) Notice: Subject to any disclaimer, the term of this patent is extended or adjusted under 35 U.S.C. 154(b) by 0 days.

(21) Appl. No.: 10/846,350

(22) Filed: May 14, 2004

(65) Prior Publication Data
US 2005/0254152 A1 Nov. 17, 2005

(51) Int. Cl.
*B60R 1/06* (2006.01)
*E02F 9/16* (2006.01)

(52) U.S. Cl. .................... 359/844; 296/1.11

(58) Field of Classification Search ........ 359/841–844, 359/871; 296/190.01, 1.11; 248/466–498
See application file for complete search history.

(56) References Cited

U.S. PATENT DOCUMENTS

| 1,255,039 | A |   | 1/1918  | Otte       |         |
|-----------|---|---|---------|------------|---------|
| 1,663,672 | A |   | 3/1928  | Therasse   |         |
| 2,573,443 | A | * | 10/1951 | Holland    | 248/480 |
| 2,636,417 | A |   | 4/1953  | Mathews    |         |
| 2,636,419 | A |   | 4/1953  | Kerr       |         |
| 2,856,814 | A |   | 10/1958 | Dillmann   |         |
| 3,005,383 | A | * | 10/1961 | Pierson    | 359/841 |
| 3,059,790 | A | * | 10/1962 | Augustus   | 414/546 |
| 3,178,042 | A | * | 4/1965  | Augustus   | 414/551 |
| 3,186,672 | A | * | 6/1965  | Weder      | 248/480 |
| 3,932,028 | A |   | 1/1976  | Klingler   |         |
| 3,946,885 | A | * | 3/1976  | Menkel et al. | 414/408 |
| 3,964,197 | A |   | 6/1976  | Tucker et al. |      |
| 4,172,638 | A |   | 10/1979 | Freedman   |         |
| 4,363,534 | A |   | 12/1982 | Covert     |         |
| 4,379,568 | A | * | 4/1983  | Kerkman    | 280/400 |
| D303,646  | S |   | 9/1989  | Clark      |         |
| 5,103,347 | A | * | 4/1992  | Lumbra et al. | 359/871 |
| 5,342,015 | A |   | 8/1994  | Burton et al. |      |
| 5,550,681 | A |   | 8/1996  | Mazarac    |         |
| 5,913,566 | A |   | 6/1999  | Stauffer et al. |    |
| 6,149,228 | A |   | 11/2000 | O'Neill et al. |     |

(Continued)

FOREIGN PATENT DOCUMENTS

| JP | 2001063464 A | * | 3/2001  |
|----|--------------|---|---------|
| JP | 2002348916 A | * | 12/2002 |
| JP | 2003193515 A | * | 7/2003  |

OTHER PUBLICATIONS

"SL5710, XL5910, XT5950 AGRACAT Loader Series", http://www.buyequipment.net/agracat_loaders.htm, 2 pages, Jul. 18, 2005. The product shown in this web page is believed to be the same product described in U.S. Appl. No. 2004/0056513 to Stone at p. 1, paragraph 6.

*Primary Examiner*—Alessandro Amari
*Assistant Examiner*—Mark Consilvio
(74) *Attorney, Agent, or Firm*—Merchant & Gould P.C.

(57) ABSTRACT

A rear view mirror assembly for a motor vehicle is disclosed. The motor vehicle includes a cab portion and a pair of pivotally movable lift arms that move up and down along the sides of the cab portion. The rear view mirror is disposed between the cab portion and the path of travel of the lift arm.

19 Claims, 9 Drawing Sheets

U.S. PATENT DOCUMENTS

| | | |
|---|---|---|
| 6,293,616 B1 | 9/2001 | Williams et al. |
| 6,467,918 B2 | 10/2002 | Strode et al. |
| 6,619,882 B2 | 9/2003 | Harvey |
| 6,846,036 B2 | 1/2005 | Stone |
| 2001/0008346 A1 | 7/2001 | Martin, Jr. |
| 2001/0011834 A1 | 8/2001 | Boyce et al. |
| 2004/0056513 A1* | 3/2004 | Stone .................... 296/190.01 |
| 2004/0218294 A1* | 11/2004 | Chen ......................... 359/871 |

* cited by examiner

REARVIEW MIRROR FOR SKID STEER LOADER

TECHNICAL FIELD

The present invention relates generally to a skid steer vehicle accessory. More particularly, the present invention relates to a rear view mirror assembly for a skid steer vehicle.

BACKGROUND

Conventional skid steer loader type vehicles have a caged cab portion for the driver and a pair of movable lift arms that pivot up and down along the sides of the caged cab. The lift arms provide detachable mounting and connection to various implements such as grading blade configurations, fork lift members, bucket members, and the like. In such vehicles, the small size of the cab, the recessed position of the driver seat within the cab, and the location of the lift arms generally make it very difficult for the driver to see the behind the vehicle. Rear view mirrors have been placed within the cab of skid steer vehicles. However, the small size of the cab makes the cab interior a less than ideal location for a rear view mirror. The present invention promotes effective use of space available on a skid steer vehicle for the placement of a rear view mirror.

SUMMARY

One inventive aspect of the present disclosure relates to a rear view mirror assembly that mounts in between the cab portion and the lift arms of a skid steer loader type vehicle.

Another inventive aspect of the present disclosure relates to a motor vehicle that includes a rear view mirror assembly that is positioned in the space between the cab portion and the lift arms of the motor vehicle.

Yet, another inventive aspect relates to a universal mirror designed to mount to skid steer loaders manufactured by a number of different manufacturers.

Examples of a variety of aspects in addition to those described above are set forth in the description that follows. It is to be understood that both the foregoing general description and the following detailed description are exemplary and explanatory only and are not restrictive of the broad inventive aspects that underlie the examples disclosed herein.

DETAILED DESCRIPTION

Figure 1:
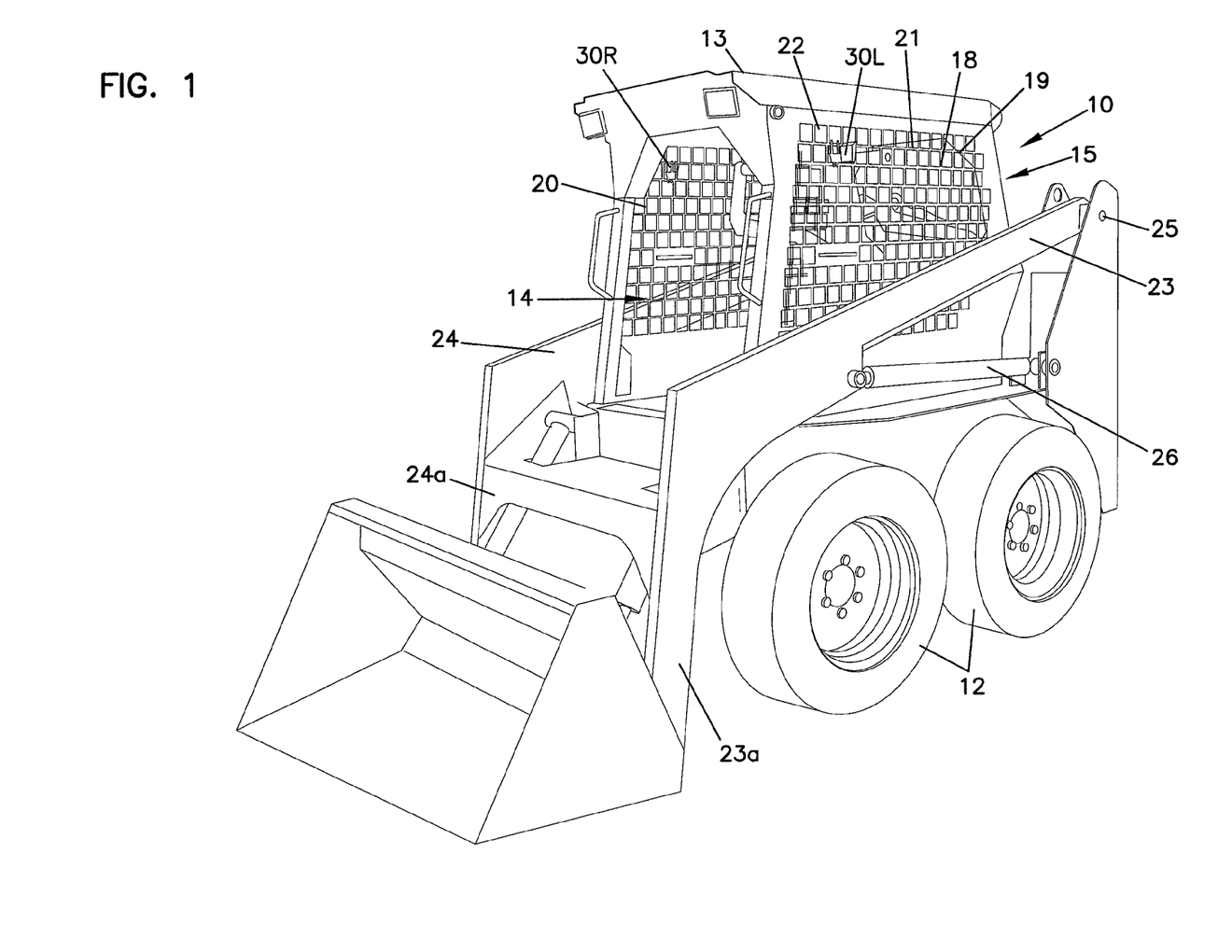
FIG. 1 is a perspective view of a motor vehicle having features that are examples of inventive aspects in accordance with the principles of the present disclosure, the motor vehicle is shown with a mirror assembly having features that are examples of inventive aspects in accordance with the principles of the present disclosure.
Figure 2:
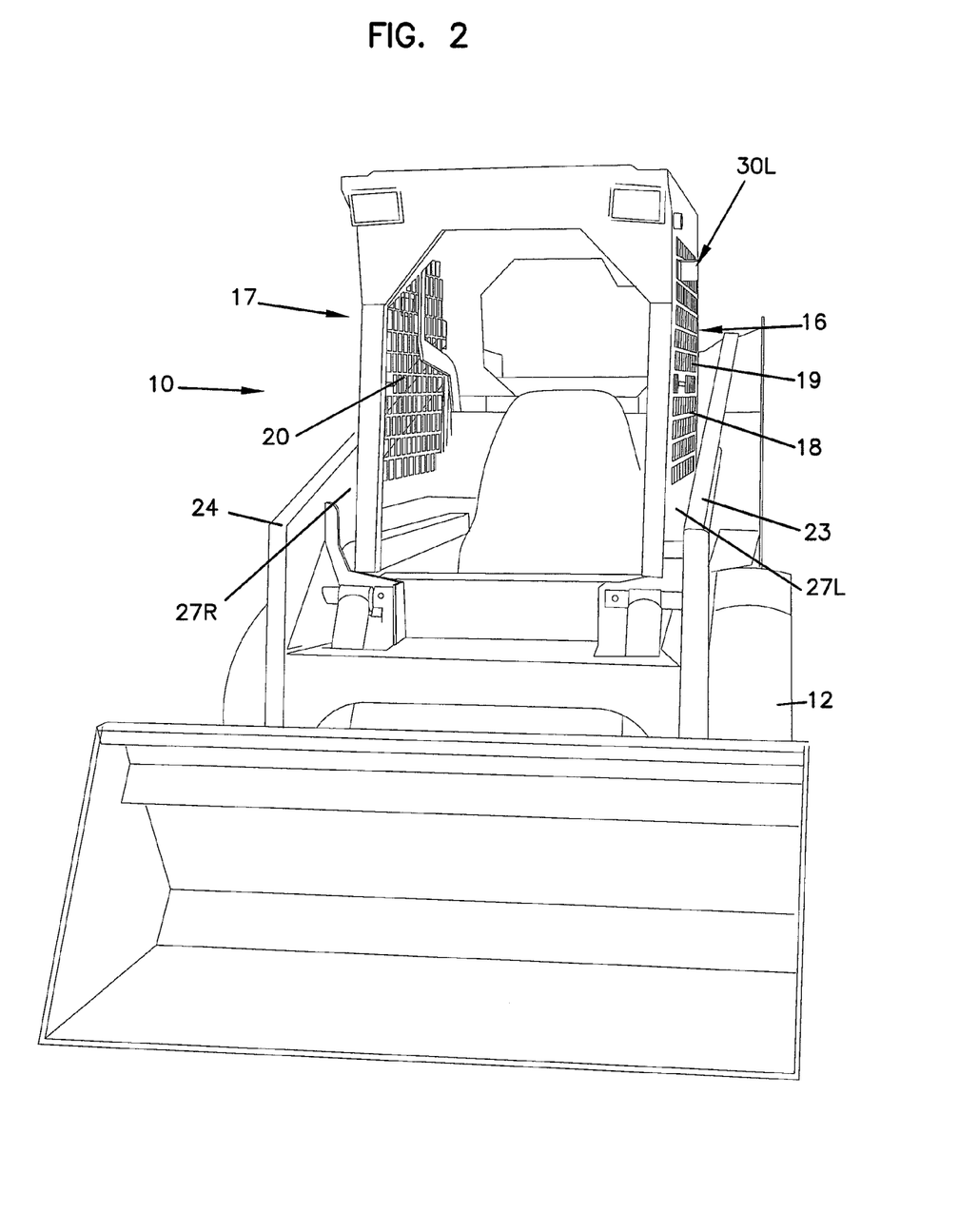
FIG. 2 is a front view of the motor vehicle of FIG. 1, showing the mirror assembly of FIG. 1 mounted on the cage of the vehicle.
Figure 3:
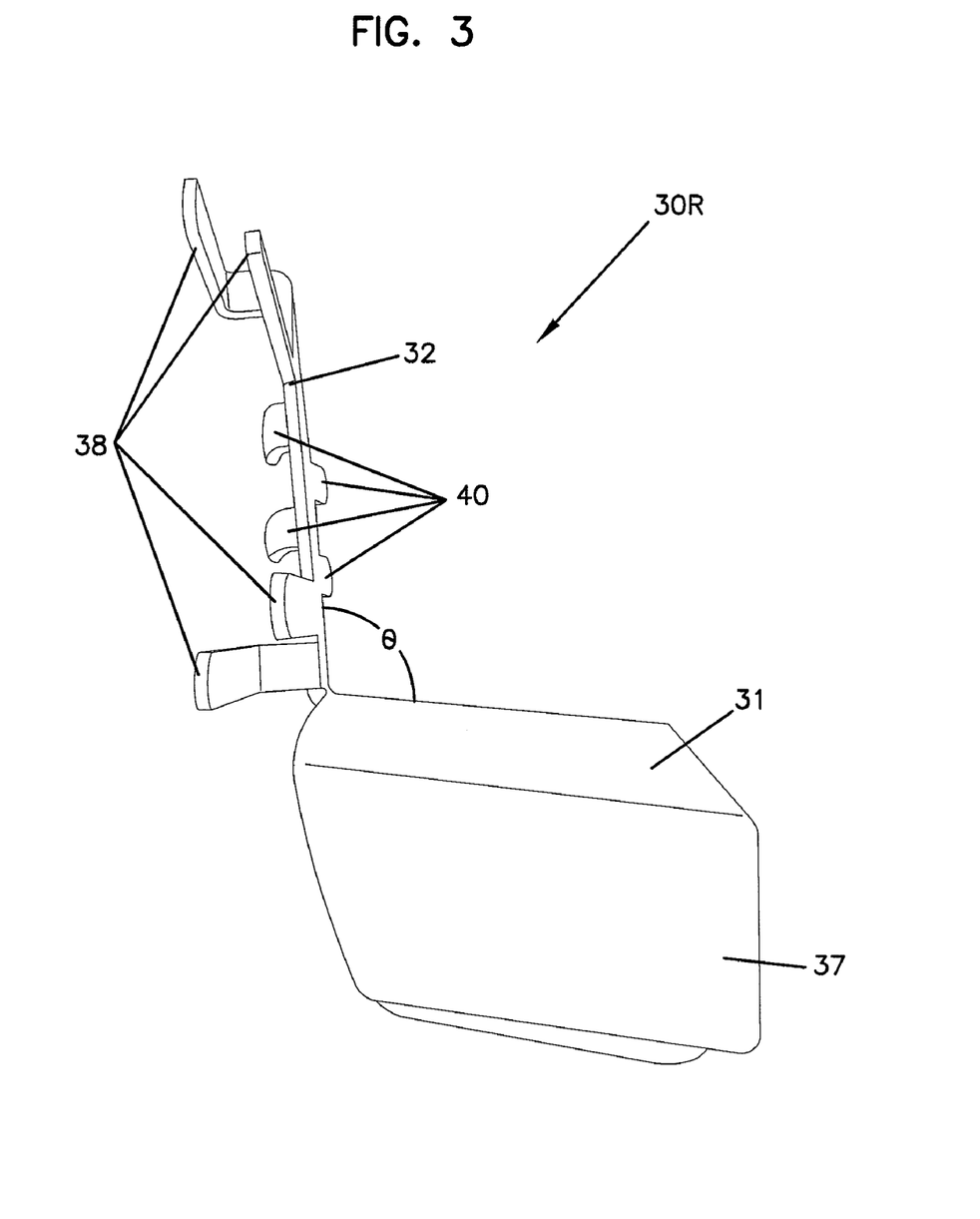
FIG. 3 is a top plan view of the mirror assembly of FIGS. 1 and 2.

Referring to the FIGS. 1 and 2, there is generally illustrated therein a motor vehicle 10 having features that are examples of inventive aspects in accordance with the principles of the present disclosure. The motor vehicle 10 is shown to include a right mirror assembly 30R and a left mirror assembly 30L (referred to as 30 when generally referring to both), having features that are examples of inventive aspects in accordance with the principles of the present disclosure.

In FIGS. 1 and 2, the motor vehicle 10 is depicted as a skid steer vehicle. It will be understood that the skid steer vehicle is simply representative of one embodiment of a motor vehicle 10 that can be used to practice the principles of the present disclosure. Other motor vehicles such as tractors with front end loaders and the like can also be used. The principles of the present disclosure can be used with both wheeled vehicles such as skid steerers and tracked vehicles such as bulldozers.

The motor vehicle 10 generally includes a chassis containing an engine and power train for moving and operating the vehicle. The motor vehicle 10 includes a plurality of wheels, generally indicated at 12, for moving the vehicle over the ground or support surface. The motor vehicle 10 includes a cab portion 13 wherein an operator sits to control the vehicle.

Referring still to FIGS. 1 and 2, the cab portion 13 includes a front side 14, a rear side 15, a right side 16, and a left side 17. The cab portion 13 also typically includes a cage structure 18 with a first grid 19 at the right side 16 and a second grid 20 at the left side 17 of the cage. The grid is made up of cross bars 21 defining openings 22 therebetween.

The motor vehicle 10 also includes a first pivotably movable lift arm 23 positioned adjacent the right side 16 of the cab 13 and a second pivotally movable lift arm 24 positioned adjacent the left side 17 of the cab 13. The lift arms 23, 24 can be raised and lowered about their rear pivot positions generally indicated at 25 to raise and lower the forward ends 23a and 24a of the lift arms relative to the ground or support surface. A pair of hydraulic lift cylinders, generally indicated at 26, may be used to provide the motive force for pivotably moving the lift arms 23, 24.

The first lift arm 23 moves up and down along the right side 16 of the cab 13, along a path of travel offset from the right side 16. The second pivotally movable lift arm 24, likewise, moves up and down along the left side 17 of the cab 13, along a path of travel offset from the left side 17 of the cab 13. Accordingly, the right and left sides 16, 17 of the cab 13 define spaced-apart, generally parallel, vertical planes and the lift arms 23, 24 move along paths of travel generally parallel to such planes, leaving right and left gaps 27R, 27L, respectively, thereinbetween. As shown in FIG. 1, the mirror assemblies can be mounted at the left gap 27L, the right gap 27R, or both. In FIG. 2, the left mirror assembly 30L is shown mounted at the left gap 27L.

Some examples of motor vehicles 10 that can be used to practice the principles of the disclosure include skid steer vehicles manufactured by CASE, Ingersoll-Rand (Bobcat), Melrose, Mustang Manufacturing Company, Inc., Caterpillar, New Holland, Thomas Equipment Ltd., Volvo, AVS, Toyota, and John Deere.

Referring to FIGS. 3-7, the right mirror assembly 30R is shown. The right mirror assembly 30R generally includes a first plate 31 and a second plate 32 disposed at an angle θ to the first plate. The angle θ formed between the first plate 31 and the second plate 32 is preferably greater than about 85 degrees and less than about 115 degrees. More preferably, the angle θ is between about 90 degrees and 105 degrees. The angle θ between the two plates can be adjusted according to the driver's preferences simply by bending the two plates relative to each other. Although the first plate 31 is depicted as being integral with the second plate 32, it should be appreciated that the two plates may be coupled together in many different ways including by welding, by fasteners, and etc. The coupling mechanism should preferably be such that it allows for an adjustment of the angle θ between the plates.

Still referring to FIGS. 3-7, the first plate 31 includes a top edge 51 and a bottom edge 52 positioned at the opposite sides of the plate. The first plate 31 also defines a length $L_1$ and a width $W_1$. The length $L_1$ of the first plate 31 is preferably between about 2 inches and 3 inches. The width $W_1$ of the first plate 31 is preferably between about 1¼ inches and 1⅞ inches. The first plate 31 includes a mirror 34 disposed between the top and bottom edges for viewing the rear of the motor vehicle 10. The mirror 34 may be coupled to the first plate 31 in many different ways including by adhesive, by fasteners, and etc.

The mirror 34 includes a length $L_M$ and a width $W_M$. The length $L_M$ of the mirror 34 is preferably between about 2 inches and about 3 inches. In certain embodiments, the length of the mirror is preferably less than about 3 inches. The width of the mirror 34 is preferably between about 1 inches and about 1½ inches. The mirror 34 preferably includes a curved convex surface 66. The curved surface of the mirror is preferably convex in two dimensions. For example, the mirror surface may be convex along length $L_M$ and along width $W_M$. The convex nature of the mirror surface 66 provides a wide range of vision for the driver of the vehicle. The first plate 31 may also have integral folded portions 37 that cover the sides of the mirror 34 for general protection of the mirror.

Also shown in FIGS. 3-7 is the second plate 32 of the right mirror assembly 30R. The second plate includes a top edge 39 and a bottom edge 41 positioned at the opposite side of the plate. The second plate 32 includes a width $W_2$ (best illustrated in FIGS. 5-7). In certain embodiments, the width $W_2$ of the second plate 32 is about 1 inch. In certain other embodiments, the width $W_2$ of the second plate 32 is equal to or less than about 1 inch. The second plate 32 also includes a top length $L_{T2}$ and a bottom length $L_{B2}$. In certain embodiments, the top length $L_{T2}$ is between about 1½ inches and about 1¾ inches. In certain other embodiments, the top length $L_{T2}$ of the second plate is less than or equal to about 1¾ inches. In certain embodiments, the bottom length $L_{B2}$ is between about 1¼ inches and about 1½ inches. In a preferred embodiment the difference between the top length $L_{T2}$ of the second plate 32 and the bottom length $L_{B2}$ of the second plate 32 is at least about ¼ inch.

As shown in FIGS. 3-7, the mirror assembly 30R is preferably constructed such that the bottom edge 41 of the second plate 32 aligns with the bottom edge 52 of the first plate 31. In this manner, when the mirror assembly is mounted on the cage, as will be described in further detail later, as the bottom edge 52 of the second plate 32 abuts against the cross bar 21, the mirror 34 aligns with an opening 22 (see FIG. 6) defined by the cross bars 21 without the cross bars 21 obstructing the view of the mirror 34 from within the cab.

Figure 4:
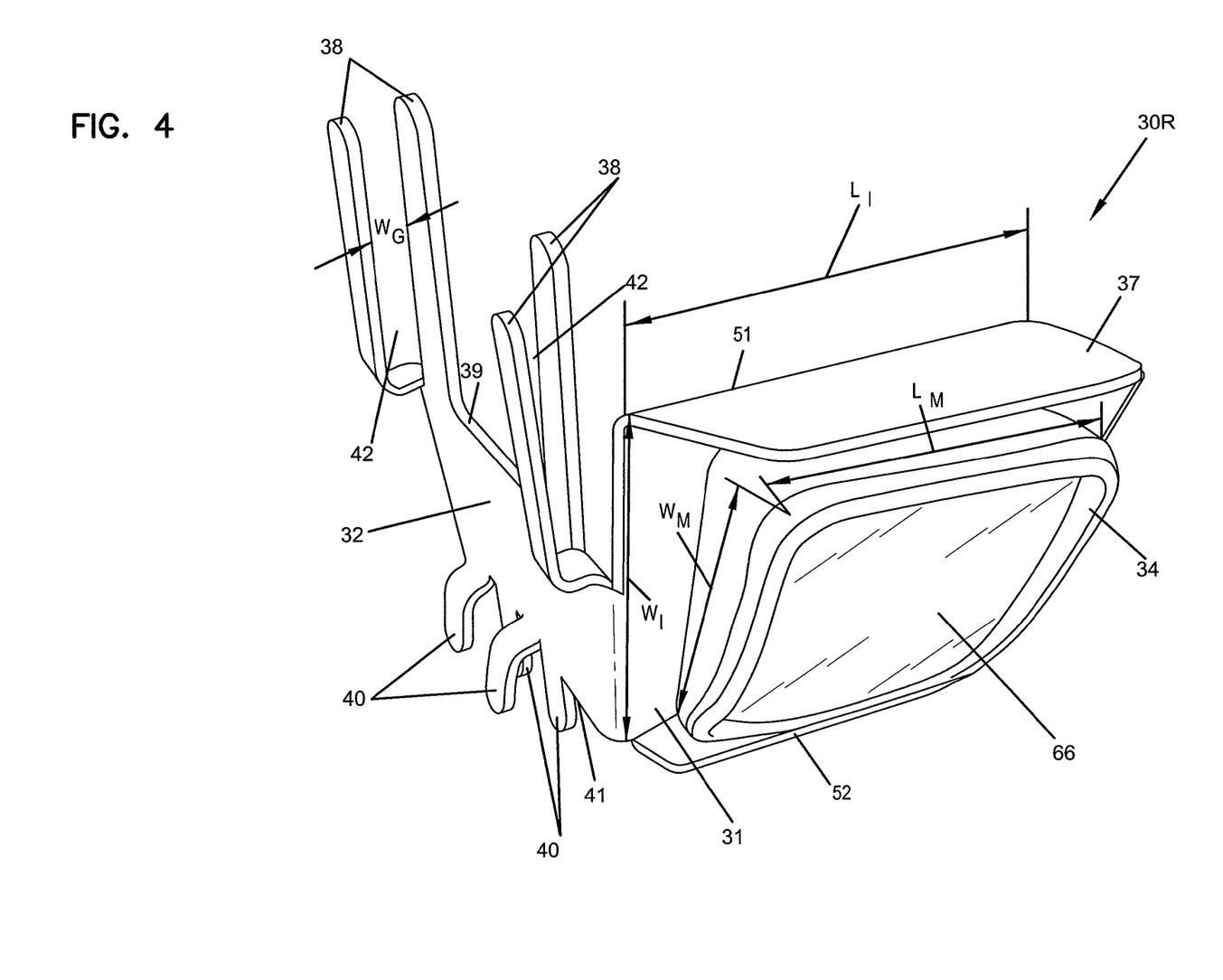
FIG. 4 is a perspective view of the mirror assembly of FIGS. 1-3.

Still referring to FIGS. 3-7, the second plate 32 includes two sets of fingers, generally indicated at 38, that project from the top edge 39 of the plate and two sets of fingers, generally indicated at 40, that project from the bottom edge 41 of the plate. As best illustrated in FIG. 4, in each of the sets of fingers 38, 40, one finger projects directly out from the edge of the plate 32 while the other finger extends out in an offset fashion from the edge. As such, a gap 42 is defined between the fingers of each set. The sets of fingers 38, 40 are used for securing the mirror assembly 30 to the cage portion 18 of the cab 13. A cross bar 21 of the grid is received within the gap 42 between the fingers. The gap 42 preferably has a width $W_G$ that is slightly larger than the thickness of the cross bar 21 so that the fingers can be slidably inserted around the cross bar 21 (i.e., the cross bar 21 fits between the fingers).

In FIGS. 3-7, the second plate 32 is depicted as having two pairs of fingers projecting from each of the top and the bottom edges 39, 41. While it is preferred to have the sets of fingers located at those locations depicted in the FIGS., it will be appreciated that in other embodiments, the number of finger sets as well as the locations of the finger sets can be modified.

The fingers may vary in length depending on the shape of the grid. In the embodiment of the right mirror assembly 30R illustrated in FIGS. 3-7, the sets of fingers 40 projecting from the bottom edge 41 are depicted as being shorter than the sets of fingers 38 projecting from the top edge 39. In certain embodiments, the top sets of fingers 38 are at least two times as long as the bottom sets of fingers 40. In certain other embodiments, the top sets of fingers 38 are at least three times as long as the bottom sets of fingers 40. In one embodiment, the top sets of fingers 38 preferably have a length $L_{TF}$ of about 1½ inches while the bottom sets of fingers 40 preferably have a length $L_{BF}$ of about ½ inches. The fingers are preferably relatively sized such that both the bottom set 40 and the tops set 38 of fingers securely engage adjacent cross bars 21 when the mirror assembly is mounted on the grid. Preferably, the distance from the bottom edge 41 of the second plate 32 to the tip of the top sets of fingers is at least about 2 inches. The bottom set of fingers 40 are preferably sized short enough such that, once the top set of fingers 38 are slid onto the crossbar 21, the bottom set of fingers 40 can fit within the opening 22 and clear the adjacent crossbar before being slid down onto the adjacent cross bar.

Figure 5:
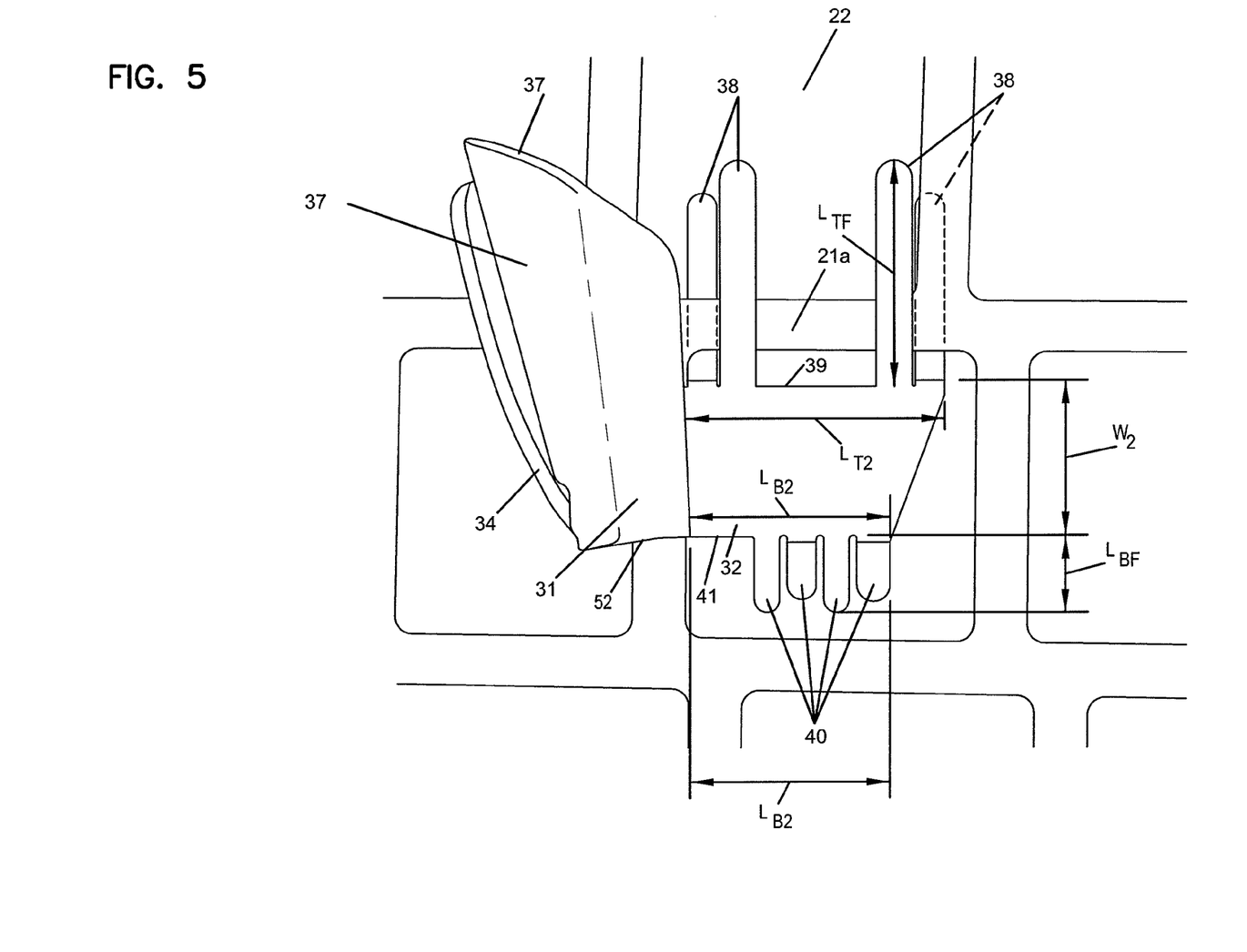
FIG. 5 is a side view of the mirror assembly of FIGS. 1-4, the top sets of fingers are shown mounted to a grid of a cage.
Figure 6:
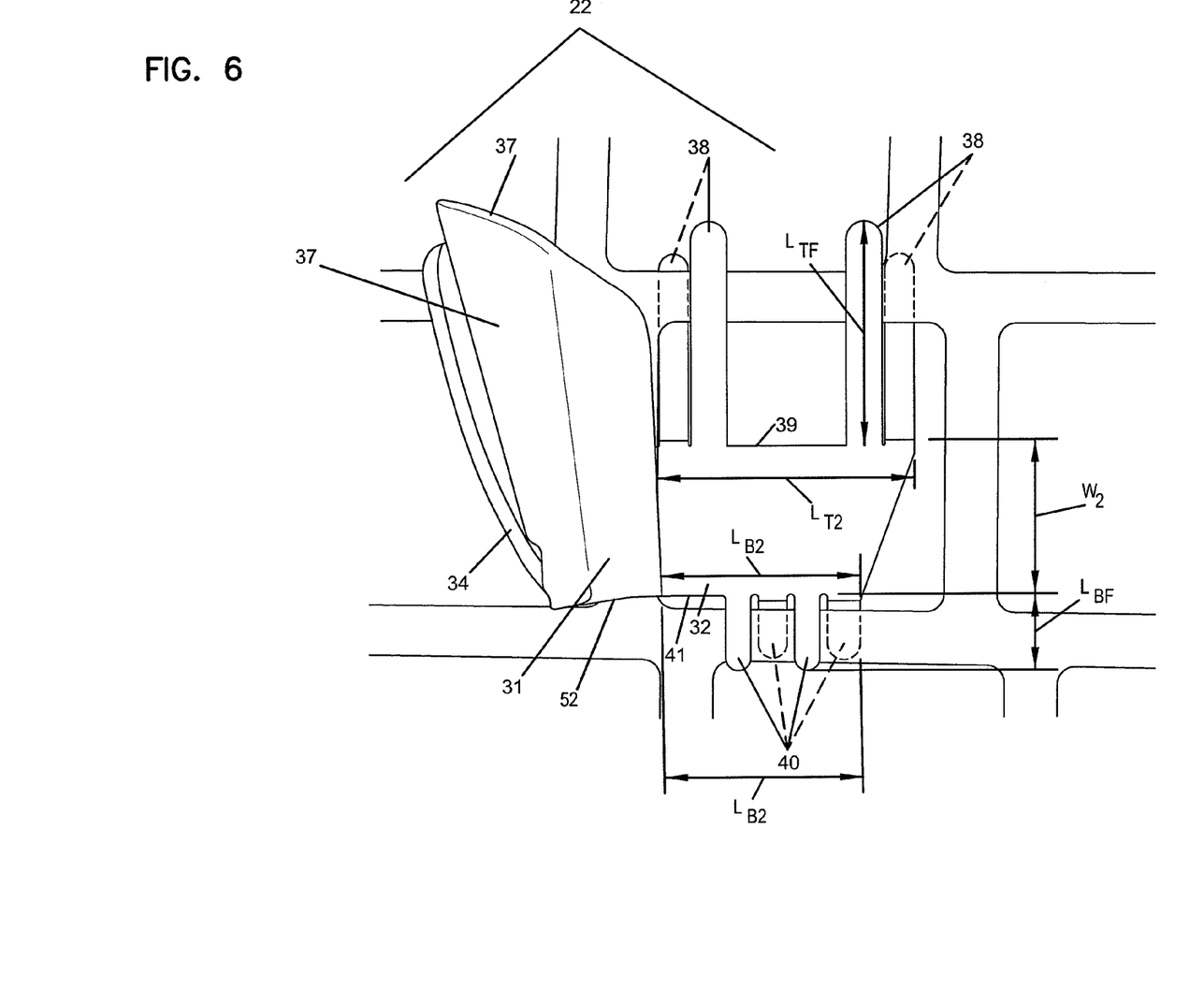
FIG. 6 is another side view of the mirror assembly of FIGS. 1-5, the top and the bottom sets of fingers are shown mounted to the grid.
Figure 7:
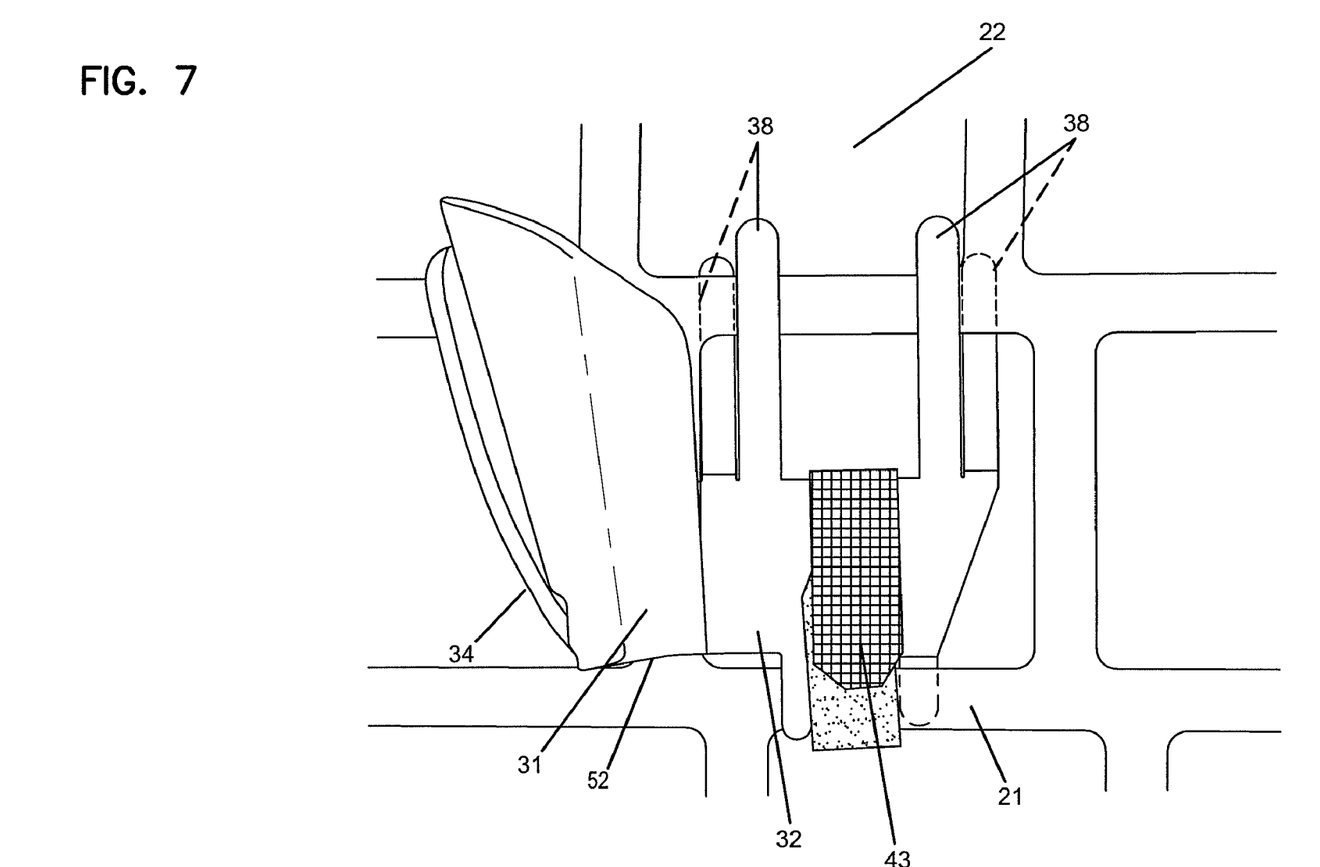
FIG. 7 is another side view of the mirror assembly of FIGS. 1-6, the mirror assembly is shown finally secured to the grid with a band.

In use, the mirror assembly is adapted to be easily and conveniently mounted on and taken off the skid steer vehicle cage 18 by the driver. FIGS. 5-7 illustrate, in sequential order, the method of mounting the mirror assembly onto the grid of the cage of the skid steer vehicle 10. A reverse order can be followed for detaching the mirror assembly from the cage 18.

As shown in FIG. 5, the sets of fingers 38 projecting from the top edge 39 of the second plate 32 are first slid up around an upper cross bar 21a of the grid portion. Next, as shown in FIG. 6, the right mirror assembly 30R is slid down, the sets of fingers 40 projecting from the bottom edge 41 engaging a lower cross bar 21b. The right mirror assembly 30R is slid all the way down onto the cross bar 21b such that the bottom edge 41 of the second plate 32 abuts against the cross bar 21b, with the mirror 34 ultimately being aligned with an opening 22. As a final step, in FIG. 7, the mirror assembly is more securely affixed to the grid with a band 43.

The band 43, although illustrated as including Velcro material for attachment, may utilize other various attachment means such as adhesives, snap-locks, buckles, and etc.

Figure 8:
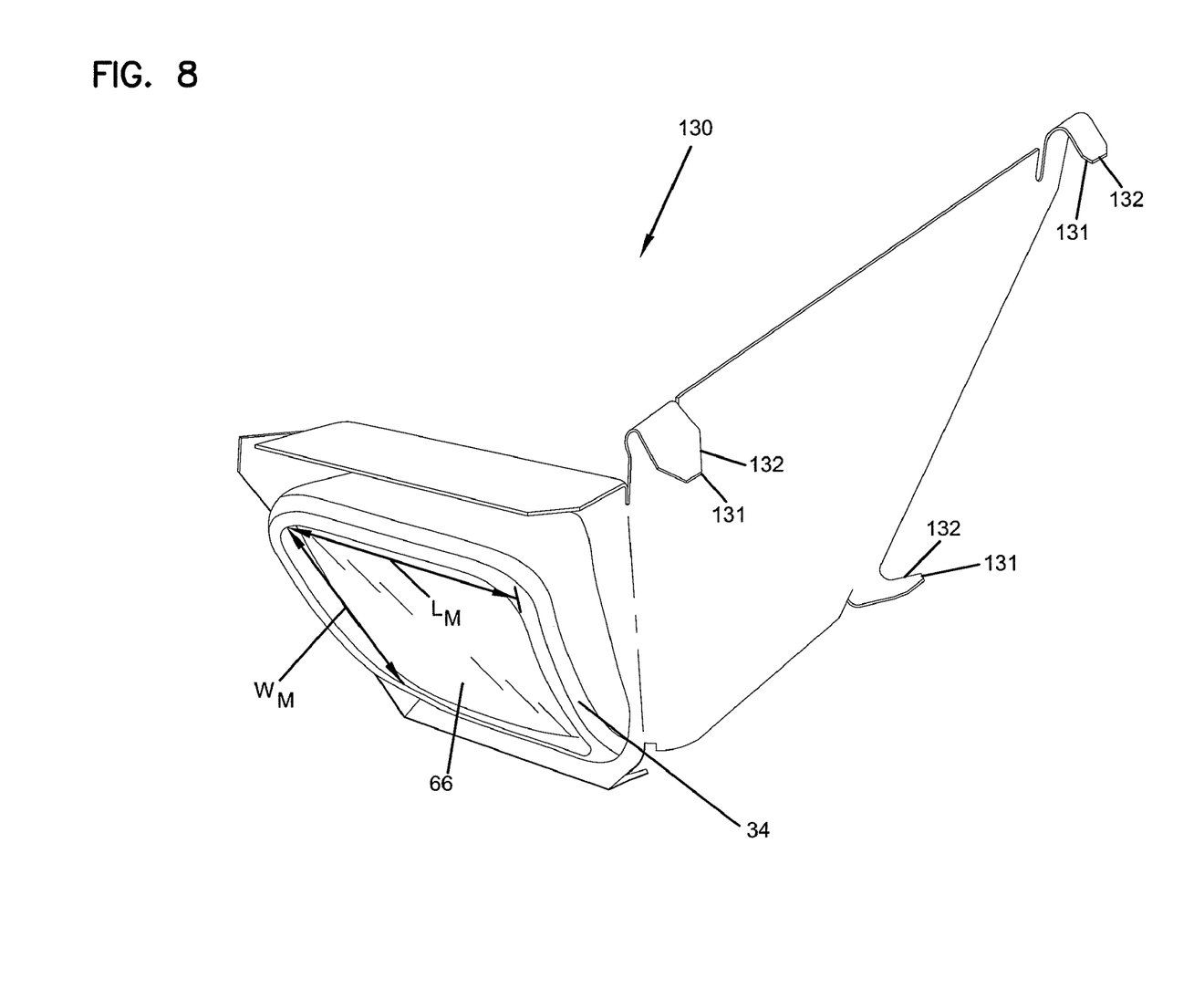
FIG. 8 is a perspective view of a second mirror assembly having features that are examples of inventive aspects in accordance with the principles of the present disclosure.

FIG. 8 shows a perspective view of a second embodiment of a mirror assembly 130 having features that are examples of inventive aspects in accordance with the principles of the present disclosure.

The mirror assembly 130 is similar to the mirror assembly of FIGS. 1-7, except that the mirror assembly 130 includes fingers (generally indicated at 131) that define bendable tabs 132. In use, the mirror assembly 130 is mounted to the grid by bending the tabs 132 over the cross-bars 21 of the grid toward the interior of the cab 13. The mirror assembly 130 shown in FIG. 8 is configured for left side attachment.

Figure 9:
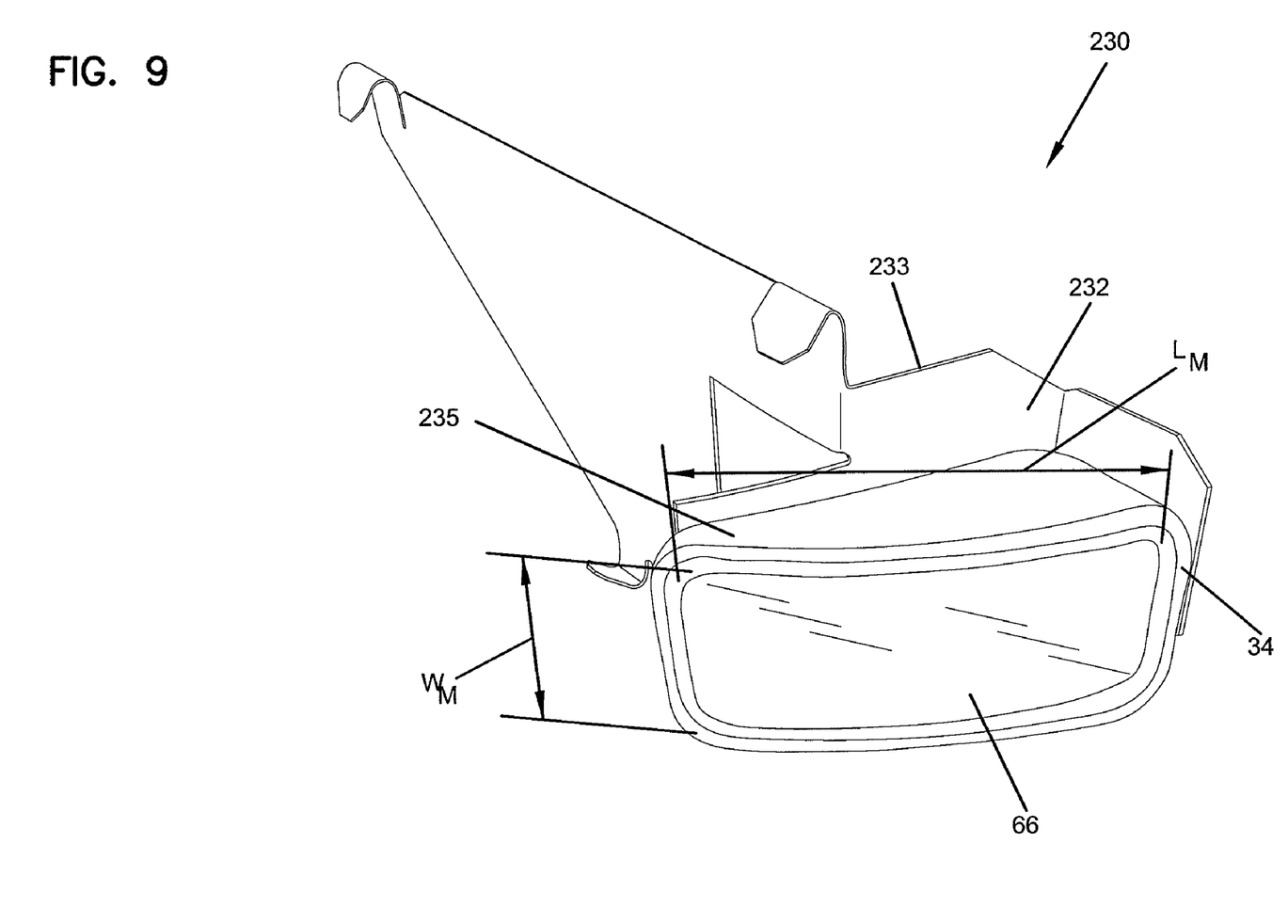
FIG. 9 is a perspective view of a third mirror assembly having features that are examples of inventive aspects in accordance with the principles of the present disclosure.

FIG. 9 shows a perspective view of a third embodiment of a mirror assembly 230 having features that are examples of inventive aspects in accordance with the principles of the present disclosure.

The mirror assembly 230 is similar to the mirror assembly 130 of FIG. 8, except that the mirror 34 is disposed on the first plate 232 with the length 35 of the mirror 34 extending parallel to the top edge 233 and the bottom edge (not shown in FIG. 9) of the plate. In contrast, in the mirror assemblies 30 of FIGS. 1-7 and 130 of FIG. 8, the mirrors are disposed on the first plates such that the length of the mirror is perpendicular to the top and bottom edges of the plate.

Due to the orientation of the mirror 231 on the plate 232, once the assembly 230 is mounted to the cab cage 18, a portion 235 of the mirror 231 extends into the cage 18 through an opening 22 defined by the cross bars 21. The mirror assembly 230 shown in FIG. 9 is configured for right side attachment.

It will be appreciated that the mirror assemblies 30, 130, and 230 can be mounted at any location on the grid of the cage 18 of the cab 13, to account for driver preferences, driver size, seat position within the cab and etc. Preferably, the mirror assemblies are mounted near the top of the cage. More preferably, the mirror assemblies are mounted near the upper third of the cage. Most preferably, the mirror assemblies are mounted near the upper quarter of the cage. However, a driver of the motor vehicle can simply remove the mirror assembly from the grid of the cage and relocate it according to his or her needs or preferences to obtain the best view.

One or multiple mirrors on one side of the cab 13 of the motor vehicle 10 or mirrors on both sides of the cab 13 can be used if desired. Preferably, the mirror assemblies are detachably mounted on the cage of the cab such that they can be detached and reattached at different locations on the cage by different drivers according to their ergonomic preferences. In certain embodiments, the mirror assemblies may be fixedly attached.

The plates of the mirror assemblies 30, 130, and 230 shown in the FIGS. are manufactured from metal. However, it should be appreciated that the plates can be manufactured from other materials such as plastic, fiberglass, and etc. In one embodiment, the plates of the mirror assembly 30 are stamped out of a sheet metal material such as 28-gauge sheet metal and then bent to the desired shape.

With regard to the foregoing description, changes may be made in detail, especially with regard to the shape, size, and arrangement of the parts. For example, while preferred embodiments may have dimensions in accordance with those specified herein, other embodiments may have dimensions outside the ranges specifically described herein. It is intended that the specification and depicted aspects be considered as illustrative only and not limiting with respect to the broad underlying concepts of the present disclosure.

I claim:

1. A motor vehicle system comprising:
   a) a motor vehicle, the motor vehicle including:
      i) a cab portion including a first side and a second side; and
      ii) a first pivotably movable lift arm positioned adjacent the first side and a second pivotably movable lift arm positioned adjacent the second side, the first lift arm moving up and down along a path of travel offset from the first side and the second lift arm moving up and down along a path of travel offset from the second side;
   b) a first rear view mirror having at least a first portion disposed between the first side and the path of travel of the first lift arm;
   wherein the cab portion includes a cage having first and second grids respectively positioned at the first and second sides of the cab portion, and wherein the first rear view mirror is mounted to the first grid; and
   wherein the first rear view mirror is mounted to a connecting structure, the connecting structure including a plurality of sets of fingers, wherein portions of the first grid fit between the fingers of each set of fingers to secure the connecting structure to the first grid.

2. The motor vehicle system of claim 1, wherein the connecting structure includes at least four of the sets of fingers, and wherein a hook and loop fastening band is further used to secure the connecting structure to the first grid.

3. The motor vehicle system of claim 1, wherein the connecting structure includes a first plate and a second plate disposed at an angle of about 85 degrees to 115 degrees to the first plate, wherein the first rear view mirror is mounted at the first plate, wherein the sets of fingers project outwardly from the second plate, and wherein the first rear view mirror includes a convex reflection surface.

4. The motor vehicle system of claim 3, wherein the second plate includes a top edge and a bottom edge, wherein the sets of fingers include first and second pairs of upper fingers that project upwardly from the top edge, wherein the sets of fingers also includes first and second pairs of lower fingers that project downwardly from the lower edge, wherein a first cross-bar of the first grid fits between the first pair of upper fingers and between the second pair of upper fingers, and wherein a second cross-bar of the first grid fits between the first pair of lower fingers and between the second pair of lower fingers.

5. The motor vehicle system of claim 4, further comprising a band wrapped around the first and second cross-bars and between the first and second pairs of upper fingers and also between the first and second pairs of lower fingers.

6. The motor vehicle system of claim 5, wherein the first and second pairs of upper fingers are longer than the first and second pairs of lower fingers.

7. The motor vehicle system of claim 3, wherein the two plates are bendable relative to each other.

8. A motor vehicle system comprising:
a) a motor vehicle, the motor vehicle including:
   i) a cab portion including a first side and a second side; and
   ii) a first pivotably movable lift arm positioned adjacent the first side and a second pivotably movable lift arm positioned adjacent the second side, the first lift arm moving up and down along a path of travel offset from the first side and the second lift arm moving up and down along a path of travel offset from the second side;
b) a first rear view mirror having at least a first portion disposed between the first side and the path of travel of the first lift arm;
wherein the cab portion includes a cage having first and second grids respectively positioned at the first and second sides of the cab portion, and wherein the first rear view mirror is mounted to the first grid; and
wherein the first rear view mirror is mounted to a connecting structure, the connecting structure including a plurality of bendable tabs that are bent around portions of the first grid to secure the connecting structure to the first grid.

9. The motor vehicle system of claim 8, wherein the connecting structure includes a first plate and a second plate disposed at an angle of about 85 degrees to 115 degrees to the first plate, wherein the first rear view minor is mounted at the first plate, wherein the tabs project outwardly from the second plate, and wherein the first rear view minor includes a convex reflection surface.

10. A vehicle system comprising:
a) a vehicle, the vehicle including:
   a cab portion including a left side and a right side, the left side including front and rear posts and a left cage grid that extends between the front and rear posts of the left side, and the right side including front and rear posts and a right cage grid that extends between the front and rear posts of the right side, the left and right cage grids each defining a plurality of openings;
   a left lift arm moveable up and down along the left side of the cab portion, the up and down movement of the left lift arm defining a left arm path of travel that extends up and down along the left side of the cab portion, the left arm path of travel being offset to the left of the left side of the cab portion;
   a right lift arm moveable up and down along the right side of the cab portion, the up and down movement of the right lift arm defining a right arm path of travel that extends up and down along the right side of the cab portion, the right arm path of travel being offset to the right of the right side of the cab portion;
b) a rear view mirror assembly mounted within one of the plurality of openings defined by at least one of the left and right cage grids, the rear view mirror assembly including a rear view mirror, wherein:
   i) if the rear view mirror assembly is mounted to the left cage grid, at least a portion of the rear view mirror of the rear view mirror assembly is positioned between the left cage grid and the left arm path of travel such that the left lift arm moves up and down past the rear view mirror as the left lift arm travels along the left arm path of travel; and
   ii) if the rear view mirror assembly is mounted to the right cage grid, at least a portion of the rear view mirror of the rear view mirror assembly is positioned between the right cage grid and the right arm path of travel such that the right lift arm moves up and down past the rear view mirror as the right lift arm moves up and down along the right arm path of travel; and
c) wherein the rear view mirror assembly includes a connection arrangement that secures the rear view mirror to the left or right cage grid by fitting within one of the plurality of openings defined by at least one of the left and right cage grids, the connection arrangement being configured so as to not be capable of supporting the rear view mirror at a position beyond the left or right arm path when the rear view mirror assembly is secured to the left or right cage grid of the cab portion.

11. The vehicle system of claim 10, further comprising means for allowing the rear view mirror to be mounted at a plurality of different positions on at least one of the left and right cage grids.

12. A vehicle system comprising:
a) a vehicle, the vehicle including:
   a cab portion including a left side and a right side;
   a left lift arm moveable up and down along a left vertical plane that is offset to the left of the left side of the cab portion;
   a right lift arm moveable up and down along a right vertical plane that is offset to the right of the right side of the cab portion;
b) a rear view mirror mounted to at least one of the left and right sides of the cab portion, wherein:
   i) if the rear view mirror is mounted to the left side of the cab portion, at least a portion of the rear view mirror is positioned between the left side of the cab portion and the left vertical plane; and
   ii) if the rear view mirror is mounted to the right side of the cab portion, at least a portion of the rear view mirror is positioned between the right side of the cab portion and the right vertical plane; and
c) the cab portion of the vehicle including a cage having grid portions positioned at the left and right sides of the cab portion, the grid portions each including cross-members defining openings, the rear view mirror being secured to one of the grid portions by at least one attachment member that extends inwardly through at least one of the openings of the grid portion and engages an interior surface of at least one of the cross-members of the grid portion.

13. The vehicle system of claim 12, wherein the rear view mirror includes a convex reflection surface.

14. A vehicle system comprising:
a) an off road vehicle including:
   a cab portion including a left side and a right side;
   a left lift arm moveable up and down along a left vertical plane that is offset to the left of the left side of the cab portion;
   a right lift arm moveable up and down along a right vertical plane that is offset to the right of the right side of the cab portion;
b) a rear view mirror mounted to at least one of the left and right sides of the cab portion, the rear view mirror including a convex mirror surface, wherein:
   i) if the rear view mirror is mounted to the left side of the cab portion, at least a portion of the convex mirror surface is positioned between the left side of the cab portion and the left vertical plane and is also positioned such that an operator at a normal driving position within the cab portion can see behind the vehicle by looking into the convex mirror surface;
   ii) if the rear view mirror is mounted to the right side of the cab portion, at least a portion of the convex mirror surface is positioned between the right side of the cab portion and the right vertical plane and is also positioned such that an operator at a normal driving position within the cab portion can see behind the vehicle by looking into the convex mirror surface; and iii) the rear view mirror is connected to the vehicle by a connection arrangement that is not capable of supporting the rear view mirror at a position located outwardly beyond the left or right vertical plane.

15. The vehicle system of claim 14, wherein the vehicle comprises a skid steer vehicle.

16. The vehicle system of claim 15, wherein the vehicle comprises a skid steer loader.

17. The vehicle system of claim 14, wherein the left side of the cab portion includes front and rear posts and the right side of the cab portion includes front and rear posts, wherein if the if the rear view mirror is mounted to the left side of the cab portion the rear view mirror is rearwardly offset from the front post of the left side, and wherein if the rear view mirror is mounted to the right side of the cab portion the rear view mirror is rearwardly offset from the front post of the right side.

18. A vehicle system comprising:
a) an off-road vehicle including:
   a cab portion including a left side and a right side;
   a left lift arm moveable up and down along a left vertical plane that is offset to the left of the left side of the cab portion;
   a right lift arm moveable up and down along a right vertical plane that is offset to the right of the right side of the cab portion;
b) a rear view mirror mounted to at least one of the left and right sides of the cab portion, the rear view mirror including a convex mirror surface, wherein:
   i) if the rear view mirror is mounted to the left side of the cab portion, at least a portion of the convex mirror surface is positioned between the left side of the cab portion and the left vertical plane and is also positioned such that an operator at a normal driving position within the cab portion can see behind the vehicle by looking into the convex mirror surface;
   ii) if the rear view mirror is mounted to the right side of the cab portion, at least a portion of the convex mirror surface is positioned between the right side of the cab portion and the right vertical plane and is also positioned such that an operator at a normal driving position within the cab portion can see behind the vehicle by looking into the convex mirror surface; and
   iii) the rear view mirror is connected to the vehicle by a non-extendable connection arrangement.

19. A vehicle system comprising:
a) an off-road vehicle including:
   a cab portion including a left side and a right side;
   a left lift arm moveable up and down along a left vertical plane that is offset to the left of the left side of the cab portion;
   a right lift arm moveable up and down along a right vertical plane that is offset to the right of the right side of the cab portion;
b) a rear view mirror mounted to at least one of the left and right sides of the cab portion, the rear view mirror including a convex mirror surface, wherein:
   i) if the rear view mirror is mounted to the left side of the cab portion, at least a portion of the convex mirror surface is positioned between the left side of the cab portion and the left vertical plane and is also positioned such that an operator at a normal driving position within the cab portion can see behind the vehicle by looking into the convex mirror surface;
   ii) if the rear view mirror is mounted to the right side of the cab portion, at least a portion of the convex mirror surface is positioned between the right side of the cab portion and the right vertical plane and is also positioned such that an operator at a normal driving position within the cab portion can see behind the vehicle by looking into the convex mirror surface; and
   iii) the cab portion includes a grid portion defining a plurality of openings, and wherein the rear view mirror includes a connection arrangement mounted in one of the openings.

* * * * *